US009287730B2

(12) United States Patent
Miller et al.

(10) Patent No.: US 9,287,730 B2
(45) Date of Patent: Mar. 15, 2016

(54) PORTABLE POWER CHARGER WITH RECHARGEABLE FLASHLIGHT

(71) Applicants: Garold C. Miller, Glastonbury, CT (US); Nathan Daniel Weinstein, Glastonbury, CT (US)

(72) Inventors: Garold C. Miller, Glastonbury, CT (US); Nathan Daniel Weinstein, Glastonbury, CT (US)

(73) Assignee: Halo2Cloud, LLC, Glastonbury, CT (US)

( * ) Notice: Subject to any disclaimer, the term of this patent is extended or adjusted under 35 U.S.C. 154(b) by 312 days.

(21) Appl. No.: 13/800,825

(22) Filed: Mar. 13, 2013

(65) Prior Publication Data

US 2014/0140048 A1     May 22, 2014

Related U.S. Application Data

(63) Continuation of application No. 13/682,985, filed on Nov. 21, 2012.

(60) Provisional application No. 61/733,145, filed on Dec. 4, 2012.

(51) Int. Cl.
*F21L 4/08*     (2006.01)
*H02J 7/00*     (2006.01)

(52) U.S. Cl.
CPC .................. *H02J 7/0068* (2013.01); *F21L 4/08* (2013.01); *F21L 4/085* (2013.01); *H02J 7/0027* (2013.01);
(Continued)

(58) Field of Classification Search
CPC ........... F21L 4/08; F21L 4/085; H02J 7/0027; H02J 7/0054; H02J 7/0055; H02J 7/0047; H02J 7/0068; H02J 2007/005; H02J 2007/0062
USPC ......................................................... 362/183
See application file for complete search history.

(56) References Cited

U.S. PATENT DOCUMENTS

| 7,273,384 B1 | 9/2007 | So |
| 7,597,570 B2 | 10/2009 | So |

(Continued)

FOREIGN PATENT DOCUMENTS

| EP | 2 306 550 A1 | 4/2011 |
| EP | 2648308 A1 * | 10/2013 |

(Continued)

OTHER PUBLICATIONS

International Search Report for PCT/US2013/072858 dated Mar. 24, 2014.

(Continued)

*Primary Examiner* — Stephen F Husar
(74) *Attorney, Agent, or Firm* — McCormick, Paulding & Huber LLP

(57) ABSTRACT

A portable power charger having an internal rechargeable battery includes a charger housing having at least power connection port and a flashlight portion having at least one flashlight bulb. The power connection port is operatively connected to the rechargeable battery and can be used to connect the charger with an external power source, an electronic device, or both. The flashlight is operatively connected to the internal battery as well, either via a direct connection, via the power connection port, or via a dedicated rechargeable flashlight battery unit that can be recharged from the battery unit of the power charger. The power connection port can act in a power input mode when the charger is connected with an external power source via the power connection port and in a power output mode when at least one electronic device is connected to the charger via the power connection port.

10 Claims, 7 Drawing Sheets

(52) U.S. Cl.
CPC ............ *H02J 7/0047* (2013.01); *H02J 7/0054* (2013.01); *H02J 7/0055* (2013.01); *H02J 2007/005* (2013.01); *H02J 2007/006* (2013.01); *H02J 2007/0062* (2013.01)

(56) References Cited

U.S. PATENT DOCUMENTS

2009/0267562 A1 10/2009 Guccione et al.
2011/0068741 A1* 3/2011 Liu ............................... 320/114

FOREIGN PATENT DOCUMENTS

| KR | 10-2006-0084309 | 7/2006 |
| KR | 10-2006-0087475 | 8/2006 |
| KR | 10-2007-0101084 | 10/2007 |

OTHER PUBLICATIONS

Cheap 2500mAh Mobile External Power Battery Charger for iPho . . . , http://www/everbuying.com/product172197.html, entitled "2500mAh Mobile External Power Battery Charger for iPhone 4/4S, Various Mobile Phones and Digital Devices", dated Dec. 28, 2012, pp. 1 through 7.

Amazon.com: Anker® Astro Mini 2600mAh—Ultra-Compant Li . . . , http://www.amazon.com/gp/product/Boo5X1Y7I2/ref=oh__details . . . , dated Dec. 28, 2012, pp. 1 through 6.

Cheap 2600mAh Aluminum Tubes Cylindrical Mobile Power for . . . , http://www/everbuying.com/product170.html, entitled "2600mAh Aluminum Tubes Cylindrical Mobile Power for iPhone 4/4S, Various Cell Phones and Digital Devices (Rose)", dated Dec. 28, 2012, pp. 1 through 7.

* cited by examiner

PORTABLE POWER CHARGER WITH RECHARGEABLE FLASHLIGHT

CROSS-REFERENCE TO RELATED APPLICATION

This application claims the benefit of U.S. application Ser. No. 13/682,985, filed Nov. 21, 2012, and U.S. Provisional Application No. 61/733,145, filed Dec. 4, 2012, which are incorporated herein by reference.

FIELD OF INVENTION

The present invention generally relates to power chargers for electronic devices, and more particularly relates to a portable charger having a flashlight, a two-way charging interface capable of operating in a power input mode and a power output mode, and other features that improve upon its use and functionality.

BACKGROUND OF THE INVENTION

Present day consumers typically own several electronic devices specifically designed for portability and use on-the-go, including, for example, a mobile phone or smart phone, a portable music player like an iPod® or an MP3 player, a tablet, a portable gaming unit, and the like. Each of these devices requires frequent recharging. Such electronic devices typically utilize a cable for connecting the device to a power source, such as a wall outlet, a car charger, an airplane charger, or a computer. However, a separate cable is usually required for each power source. Moreover, different electronic devices often utilize different connection ports and interfaces such that a single charging cable is not compatible with multiple devices. Accordingly, a tech-savvy consumer, with several electronic devices, will usually have multiple charging cables to keep track of. Even then, the consumer may be without sufficient power to recharge a phone due to bad weather or a power outage, or may not always be in a place where a power source is readily available, or even if so, may not have the appropriate cable or adapter available to use with a particular power source.

With traditional power sources, such as those noted above, it is difficult to charge multiple devices at the same time, especially where each device requires a separate charging cable. For example, a car charger port will only handle a single cable at a time. Adaptor devices are available on the market for connecting multiple devices to a power source at the same time—for example, a two-to-one or three-to-one car charger splitter. However, such adapters are often only compatible with certain interfaces. Moreover, such adapters are separate from portable power sources and tend to be bulky.

Similarly, interface attachments are also available for adapting a charging cable for use with a variety of devices for recharging from a power source, each with a different interface. However, such attachments are usually separate pieces, and therefore difficult to keep track of when not in use. Further, use of such attachments does not solve the problem presented by the need to charge multiple devices at the same time, from the same power source, as oftentimes, only one attachment can be used with a charging cable at a time.

Existing power charger devices also usually cannot charge multiple devices at the same time. Even if multiple devices may be attached to the power charger at the same time, the charger will prioritize how the devices are recharged—i.e., it will charge one device first and then the second, and so on. However, this approach takes a long time to recharge all devices and risks not having sufficient charge remaining in the charger for fully charging the second device.

Further, some portable charger devices will not permit recharging from the charger when the charger is itself being recharged or connected to an external power source. Such devices require the charger unit to be disconnected from a power source before a charge will be passed on to a device connected to the charger, or require the charger unit to be fully charged first before any device connected to the charger unit can be recharged.

Additionally, such portable charger devices typically require a dedicated input port for recharging the internal battery and a separate output port dedicated for recharging electrical devices from the internal battery. More particularly, such charging devices often require multiple output ports for recharging multiple electronic devices at the same time. The addition of extra charging ports compromises the size and design of the charger unit, for example, a unit with a dedicated input port and two or more output ports would need to be larger than a charger unit with just a single port due to the need to properly arrange the electronics for operation of the charger as desired.

In view of the foregoing, there is a need for a charger that can be used to charge a variety of electronic devices, including but not limited to smart phones, mobile phones, data tablets, music players, cameras, camcorders, gaming units, e-books, Bluetooth® headsets and earpieces, GPS devices, and the like, either individually or collectively in various combinations. Additionally, there is a need for such a charger that is portable, has a compact size, and is easy to use in various conditions and locations to charge one or more electronic devices simultaneously, including but not limited to in a house or office, a car or an airplane. Still further, there is a need for a portable charger having a port that can act both as an input port for recharging an internal battery unit in the charger and as an output port for recharging an electronic device connected to the charger. Still further, there is a need for a portable charger that can recharge the internal battery from an external power source at the same time as an electronic device connected to the charger, even while both the external power source and the electronic device are connected to the charger through the same port. Still further, there is a need for a portable charger unit in a compact size that has increased functionality for a user requiring a portable source of power. Accordingly, it is a general object of the present invention to provide a portable charger that improves upon conventional power chargers currently on the market and that overcomes the problems and drawbacks associated with such prior art chargers.

SUMMARY OF THE INVENTION

In accordance with the present invention, a portable charger is provided for charging one or more electronic devices. In general, a portable charger kit may comprise a portable charger unit having an internal rechargeable battery unit for connecting to and recharging one or more electronic device, as necessary, and a connector cable for connecting the power charger unit with an external power source, or at least one electronic device, or both.

In a first aspect of the present invention, the charger unit comprises a charger housing and a rechargeable battery unit disposed therein and operatively connected to at least one power connection port that can operate as either a power input (for providing an electrical charge from an external power source for recharging the internal battery unit when the charger unit is connected to the external power source) or a power output (for charging the internal batteries of other electronic devices from the rechargeable battery unit) or both. The charger further comprises a flashlight powered from the internal battery unit.

In a second aspect of the present invention, the charger unit comprises a charger housing with a flashlight portion, or cap, including a flashlight, that is removably connected to the charger housing. The charger housing also comprises a power connection port operatively connected with a rechargeable battery unit disposed within the charger housing. The flashlight portion of the charger unit includes a connection interface that is removably connected to the power connection port. When the flashlight portion is attached to the charger housing via the power connection port, the flashlight can be powered by the internal battery of the charger unit. When the flashlight portion is removed from the charger housing, the power connection port is exposed for connection to an external power source, at least one electronic device, or both. In embodiments of the present invention, the flashlight portion can remain connected to the charger housing by some means, for example by a tether, even when disengaged from the power connection port.

In a third aspect of the present invention, the charger unit comprises a charger housing with a flashlight portion, or cap, including a flashlight, that is removably connected to the charger housing. Each of the charger housing and the flashlight portion includes its own respective rechargeable battery unit. When the flashlight portion is connected to the charger housing, for example, via a power connection port, the flashlight battery unit is recharged from the charger battery unit. When the flashlight portion is removed from the charger housing, the flashlight can be used separate from the charger—for example, when the charger is connected via a power connection port to an external power source, at least one electronic device, or both.

In another aspect of the present invention, the charger unit comprises a charger housing with a power connection port which can operate as a two-way charging interface. A rechargeable battery unit is disposed within the charger housing and is operatively connected with the power connection port, which may act as a power input (for providing an electrical charge from an external power source for recharging the internal battery unit when the charger unit is connected to the external power source), and which may act as a power output (for charging the internal batteries of other electronic devices from the rechargeable battery unit). The charger further includes a controller or processing unit that determines which operational mode the power connection port is in based on what is connected to the port.

In the various embodiments of a charger unit in accordance with the present invention, multiple power connection ports can be provided on the charger housing, including connection ports dedicated to power input, connection ports dedicated to power output, and/or connection ports comprising a two-way charging interface.

The charger unit is portable as a result of the small size of the housing. Despite the small size of the unit, the power capacity is very high so that the charger can accommodate multiple electronic devices at the same time via the common power connection port. Similarly, the charger can utilize a common two-way power connection port to connect the internal battery unit to an external power source for recharging while simultaneously connecting the charger to one or more electronic devices for recharging via the power connection port.

In preferred embodiments of the present invention, the charger unit automatically turns on when it is connected with an electronic device needing charging. More particularly, the charger unit detects the presence of a connector cable in connection with the power connection port, as well as the presence of an electronic device on the other end of the connector cable to draw power from the charger unit via the connector cable. Such technology utilizes an internal switch disposed within the charger housing and operatively connected to the rechargeable battery unit that actuates to an "on" position when the appropriate conditions are met.

In various embodiments of the present invention, the charger unit may further comprise a controller and internal logic, which can sense the connection of one or more electronic devices with the charger via the power connection port, determine if the charger is connected to an external power source via the power connection port, and coordinate operation of the power connection port as either a power input or a power output, or both. In preferred embodiments, the power connection port can be used as a conduit for charging the internal battery unit from an external power source and as a conduit for charging electronic devices from the charger, often at the same time.

In an embodiment of the charger unit of the present invention, a connector cable, having multiple connection interfaces, is attached to the charger housing via the power connection port of the charger unit. Preferably, the connector cable includes a power interface for connecting the cable with the two-way power connection interface of the charger, one interface for connection with an external power source for directly recharging the internal rechargeable battery unit in the charger, and at least one interface for connection with an electronic device for recharging from the internal battery unit or directly from the external power source when the connector cable is connected to the electronic device, the portable charger and the external power source at the same time.

In another aspect of the present invention, a squid connector cable is provided for facilitating connection of one or more electronic devices to the portable charger unit or another power source. In a preferred embodiment, the squid connector comprises a USB connector adapted to engage the power connection port of the portable charger unit or any other device with a USB port; a connection interface for connection of the cable with an external power source, for example, a traditional plug interface for connection with a wall socket, a car charger interface for connection with a car charger socket, an airplane charger interface for connection with an airplane charger socket, and a standard USB interface for connection with a USB port on a power source such as a computer; and multiple connector interfaces adaptable for connection with various electronic devices. The power supply connection interfaces can be interchangeable.

An advantage of providing multiple connector interfaces on a common connector cable is that several electronic devices can be charged at the same time. Additionally, the portable charger unit can be connected to an external power source and several electronic devices at the same time, both for charging the electronic devices and recharging the internal battery unit of the portable charger. Moreover, multiple connector interfaces can be designed to attach to and accommodate various types of devices, including smart phones, mobile phones, data tablets, music players, cameras, camcorders, gaming units, e-books, Bluetooth® headsets, GPS devices, and the like. The connector interfaces can be interchangeable.

The present invention is also directed to a method for using a portable power charger having a rechargeable internal battery that is operatively connected to a power connection port capable of operating in a power input mode and a power output mode. In accordance with an embodiment of the method, the power charger is connected to a first end of a connector cable via the power connection port of the power charger. The power charger is placed in the power input mode if a second end of the connector cable is connected to an external power source, whereby an electrical charge is provided to the internal battery of the power charger form the external power source to recharge the internal battery. The power charger is placed in the power output mode if the second end of the connector cable is connected to at least one electronic device having an internal battery, whereby an electrical charge is provided from the internal battery of the power charger to recharge the internal battery of the at least one electronic device.

In accordance with another embodiment of the method, the power charger includes a rechargeable internal battery and a processing unit each connected to a power connection port. The processing unit determines if a connector cable is connected to the power connection port, and if so, also determines if the connector cable is connected to at least one of (i) an external power source supplying an electrical charge through the connector cable, and (ii) an electronic device attempting to draw an electrical charge through the connector cable. If both conditions are met, the power charger is turned on. In another aspect of the method, the power charger is shut off if the internal battery of the power charger is fully charged and if the internal battery of any electronic device connected to the power charger via the connector cable is fully charged.

These and other objects, features and advantages of the present invention will become apparent in light of the detailed description of embodiments thereof, as illustrated in the accompanying drawings.

DETAILED DESCRIPTION OF THE DRAWINGS

Figure 15:
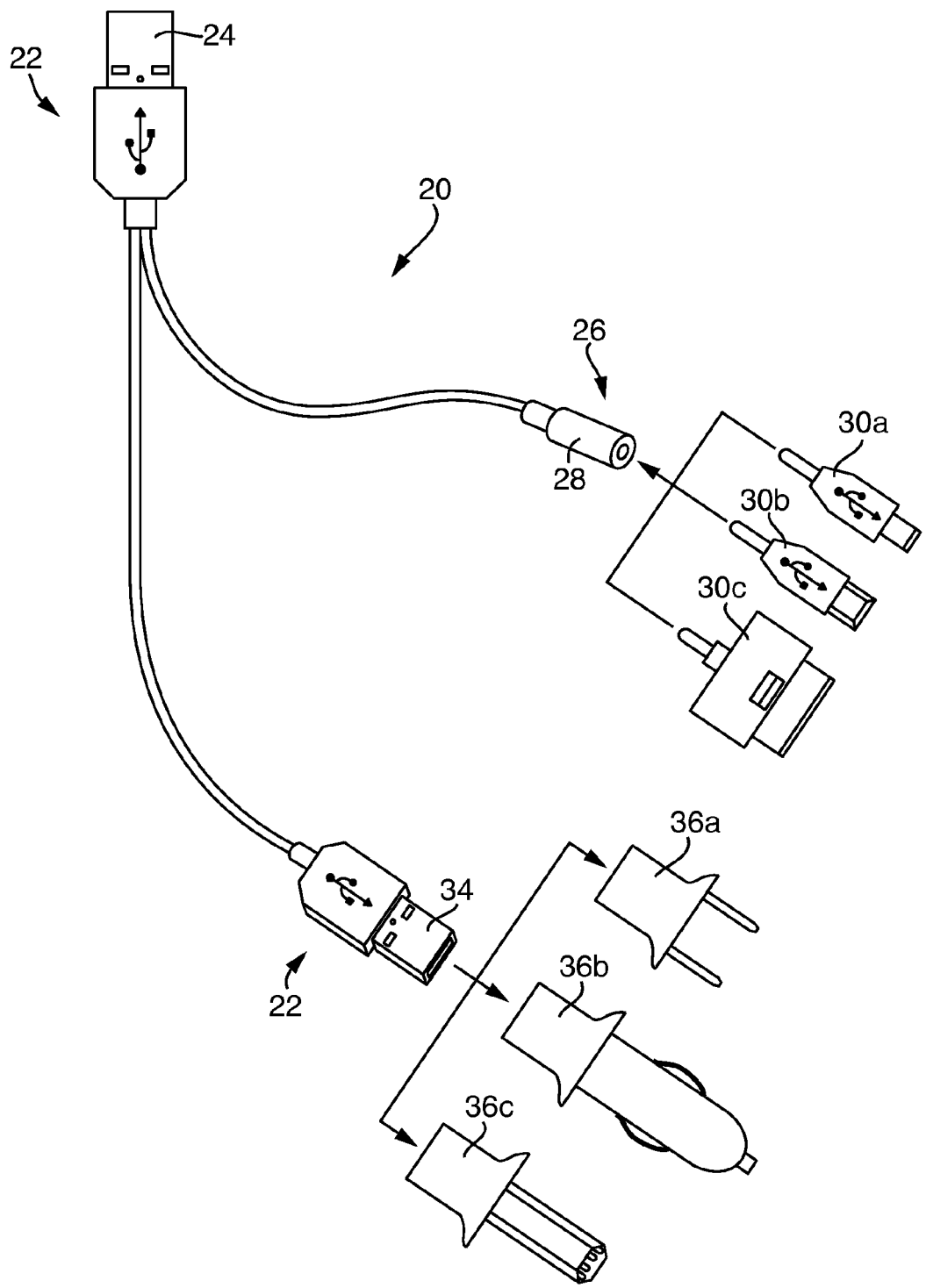
FIG. 15 illustrates an embodiment of a connector cable that may be used with a portable charger unit in accordance with the present invention.

A portable charger in accordance with an embodiment of the present invention is shown in FIGS. 1-5, and generally designated by reference numeral 10. As illustrated, the charger 10 comprises a charger housing 12 having a rechargeable internal battery 50 (as illustrated in FIG. 6) for recharging one or more electronic devices via at least one power connection port and a flashlight portion 80 comprises at least one flashlight bulb 82 for projecting light from the charger housing 12. The portable charger concepts described herein can be used with a connector cable 20 having multiple connection interfaces for connecting the charger unit with an external power source for recharging the internal battery unit and one or more electronic devices for recharging from the charger unit, as necessary, such as illustrated in FIG. 15.

The portable charger in accordance with the present invention may have a variety of designs, including the embodiments discussed and illustrated herein, and may be provided with connector cables, connection interfaces and adapters suitable for recharging the internal battery of the charger unit and recharging the batteries of various electronic devices connected thereto. For example, alternative designs for the portable charger unit are illustrated and described in co-pending U.S. application Ser. No. 13/571,992, filed Aug. 10, 2012, and Ser. No. 13/682,985, filed Nov. 21, 2012, which share common inventors with the present application and which are incorporated herein by reference. Such designs as shown in those applications can be provided with the features described herein, including specifically a flashlight portion for increasing the functionality of the power charger.

Figure 1:
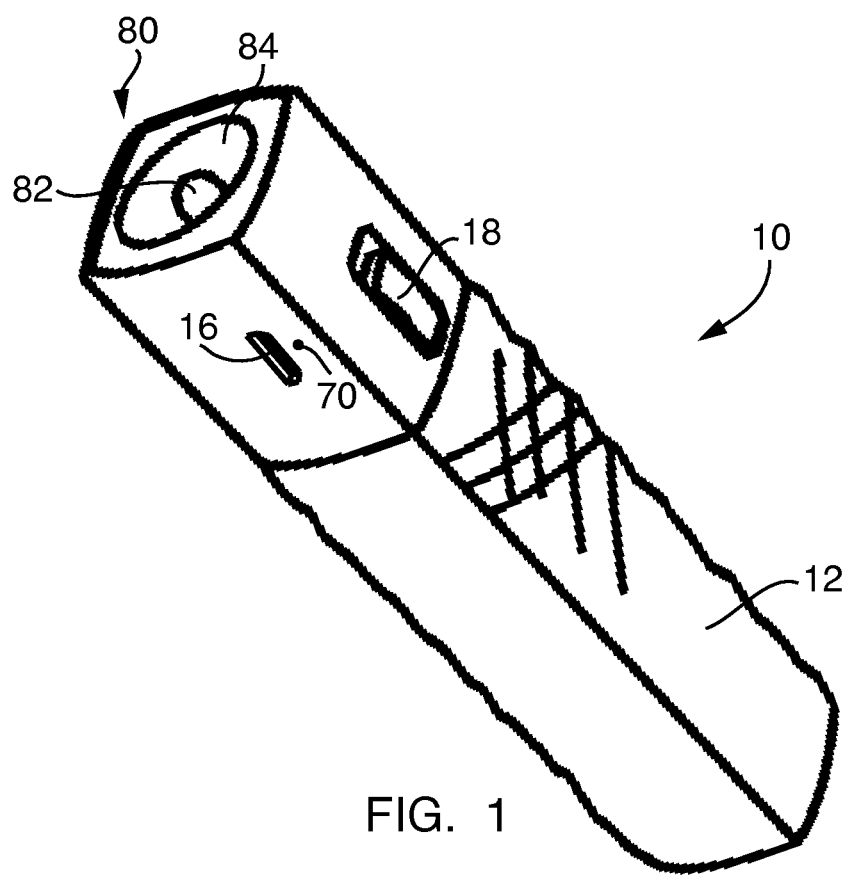
FIG. 1 shows a perspective view of a first embodiment of a portable charger in accordance with the present invention.
Figure 2:
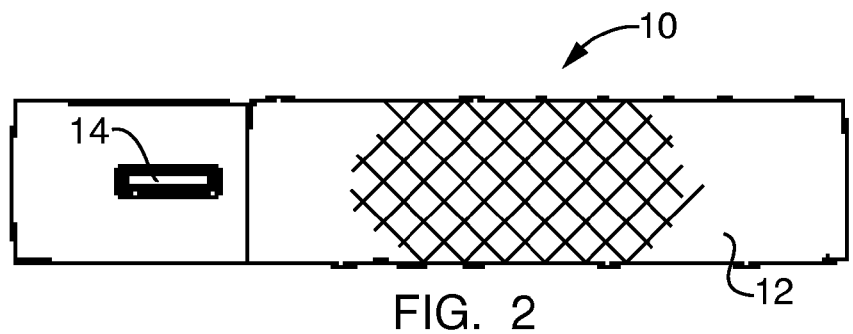
FIG. 2 shows a planar side view of the portable charger of FIG. 1.
Figure 3:
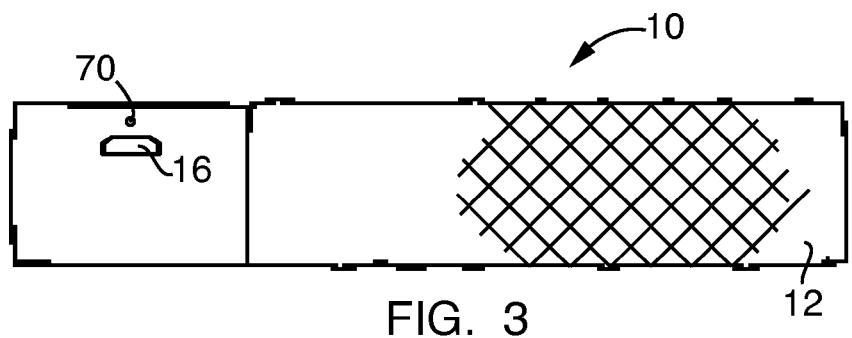
FIG. 3 shows another planar side view of the portable charger of FIG. 1.
Figure 8:
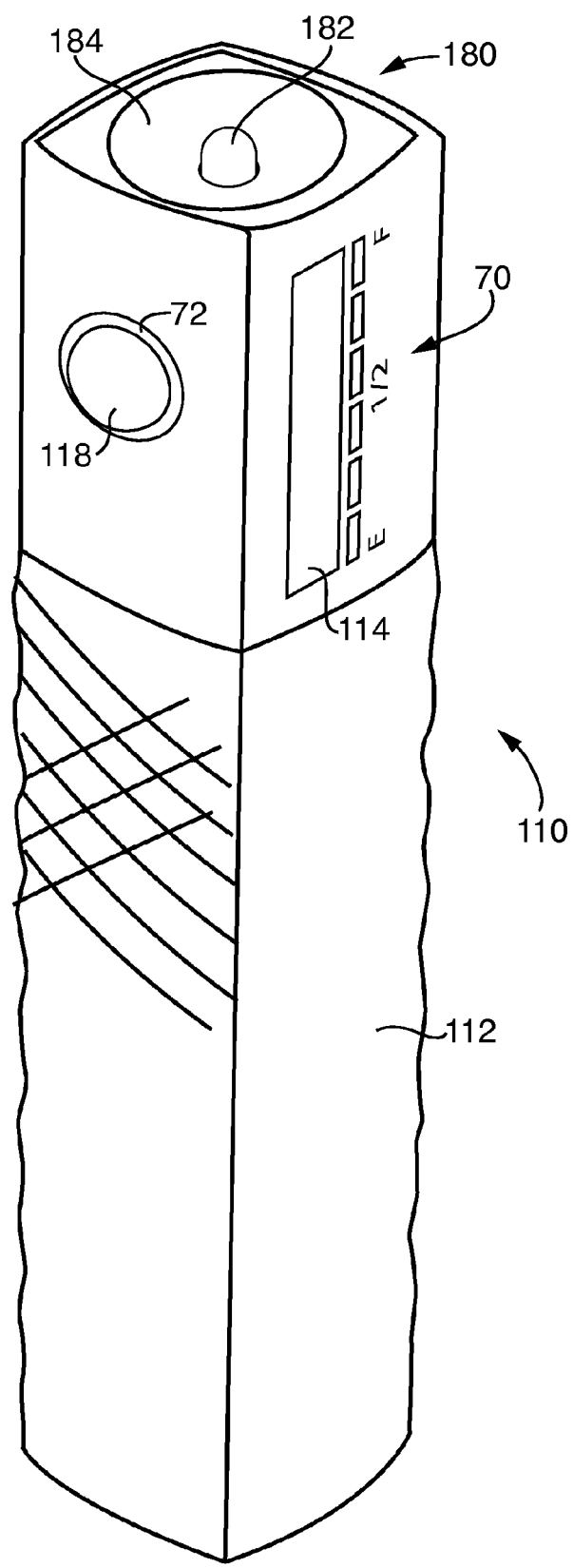
FIG. 8 shows a perspective view of a second embodiment of a portable charger in accordance with the present invention.
Figure 9:
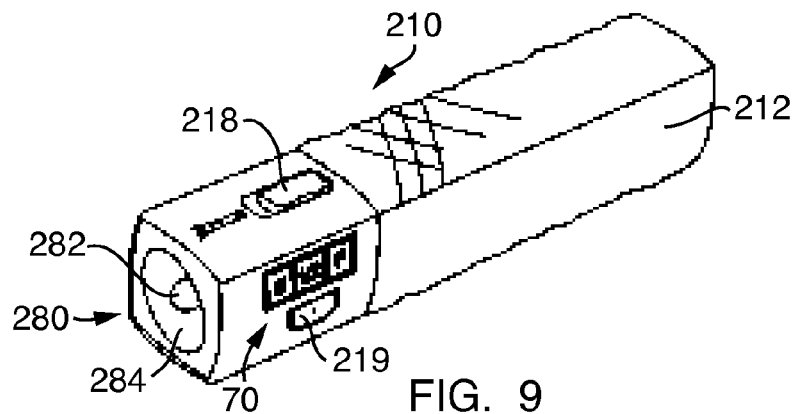
FIG. 9 shows a perspective view of a third embodiment of a portable charger in accordance with the present invention.
Figure 10:
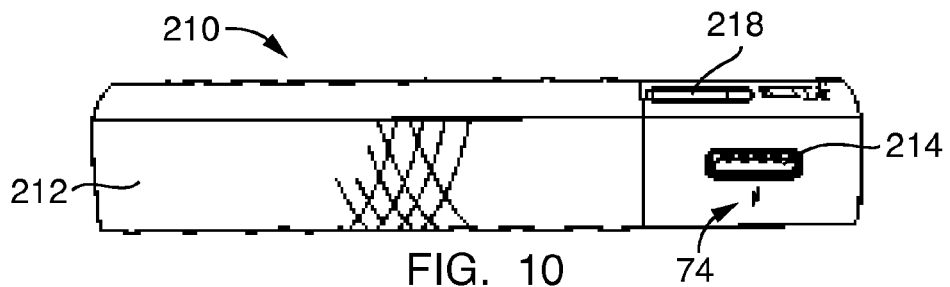
FIG. 10 shows a side view of the portable charger of FIG. 9.
Figure 11:
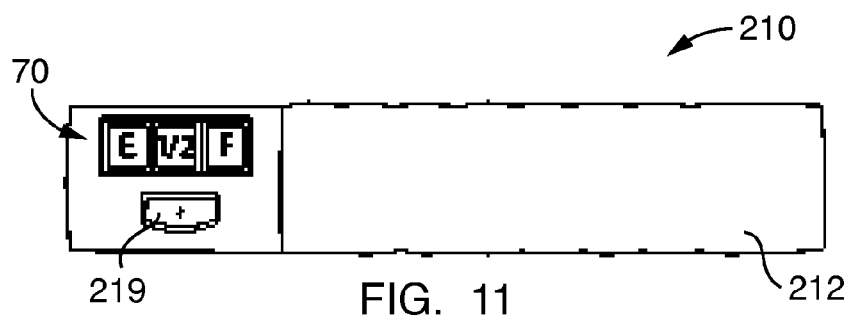
FIG. 11 shows planar side view of the portable charger of FIG. 9.
Figure 12:
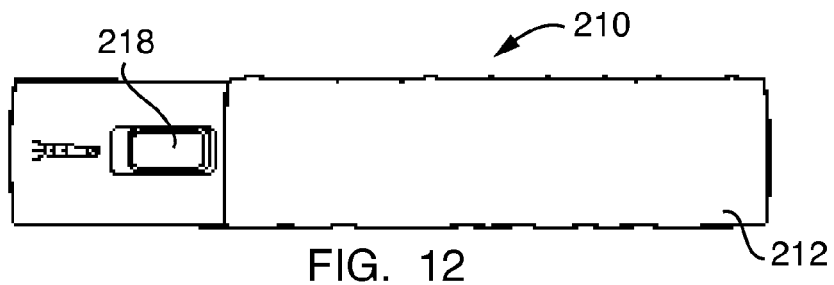
FIG. 12 shows a planar top view of the portable charger of FIG. 9.

Referring to FIGS. 1-4, the charger housing 12 includes a first power connection port 14, a second power connection port 16, and a power control switch 18. As shown in FIG. 2, the first power connection port 14 generally takes the form of a USB port, but can take the form of any known interface for connecting a device with a power source or another electronic device, including but not limited to a mini-USB interface, a micro-USB interface, or an AC-to-DC connector interface. Referring to FIG. 3, the second power connection port 16 generally takes the form of a micro-USB port, but likewise can take the form of any known interface for connecting a device with a power source or another electronic device, including but not limited to a USB interface, a mini-USB interface, or an AC-to-DC connector interface. In alternative embodiments, such as illustrated in FIGS. 8 and 9, a charger 110 or 210 can comprise a charger housing 112 or 212 that uses a single power connection port 114 or 214 that operates as a two-way charging interface, such as described in co-pending U.S. application Ser. No. 13/682,985, incorporated herein by reference. Still further, alternate designs of charger housings for a charger in accordance with the present invention can be provided with additional power connection ports, as desired, that can operate as dedicated power inputs, dedicated power outputs, or two-way charging interfaces.

Referring to FIG. 6, the power connection ports 14 and 16 of the charger 10 are in operative communication with the internal rechargeable battery unit 50 disposed within the charger housing 12, which is further in operative communication with the power control switch 18. Thus, the user can actuate the switch 18 to an "On" position to provide a charge to an electronic device via a power connection port to which the electronic device is connected. As shown in FIG. 6, the power control switch 18 can effect actuation of an internal switch 52 to begin supplying a charge via a power connection port—e.g., port 14. When the electronic device is fully charged, the power control switch 18 can be actuated to an "Off" position to stop sending a charge from the internal battery 50 and preserve the battery's charge level. When the power control switch 18 is moved to the "Off" position, it can effect opening of the internal switch 52.

Additionally, the power control switch 18 can be used to control the charge sent to the internal battery unit 50 from an external power source. That is, when the switch 18 is in its "On" position, a charge can be provided from an external power source to the internal battery unit 50 for recharging, for example, from power connection port 16.

Figure 7:
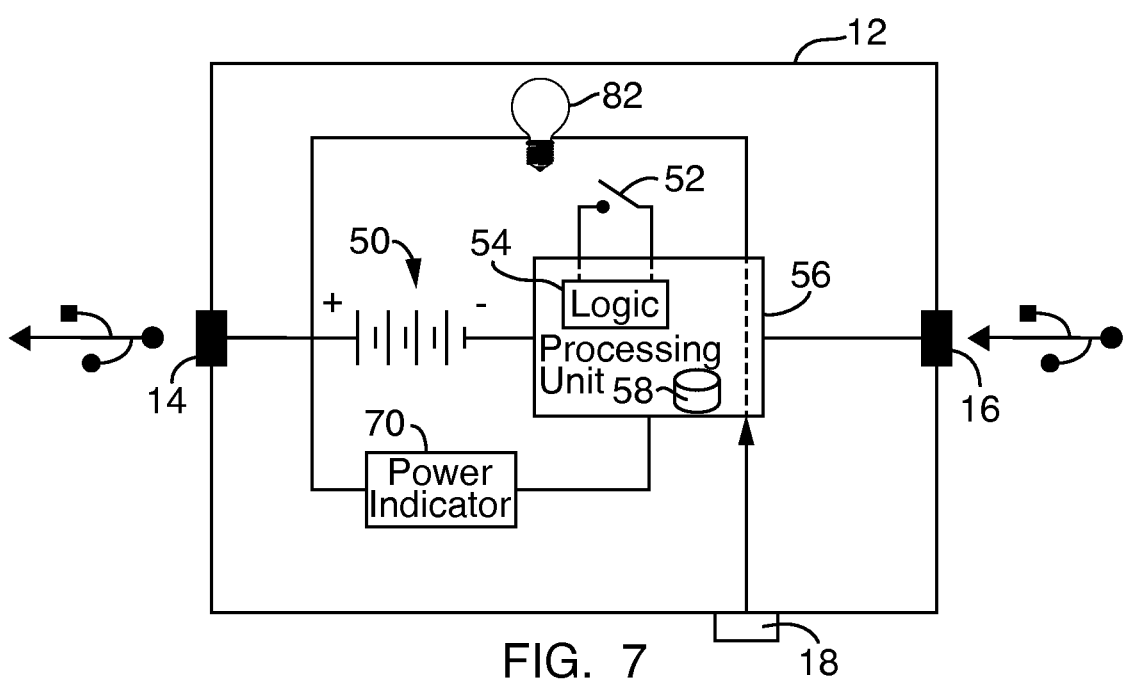
FIG. 7 illustrates a schematic view of internal components of an alternate design on the portable charger of FIG. 1.

In alternative embodiments, the charger unit 10 can utilize an automatic power on/power off methodology, such as described in co-pending U.S. application Ser. No. 13/682,985, incorporated herein by reference, whereby the charger unit 10 automatically turns on to provide a charge to an electronic device connected to the charger unit 10 or receive a charge to recharge the internal battery 50 when the charger unit 10 is connected to an external power source, and automatically turn off when the internal battery unit 50 is fully charged and the respective battery units of electronic devices connected to the charger unit 10 are fully charged as well. In such a design, as illustrated in FIG. 7, operation of the charger unit 10 is controlled by the internal switch 52, which operates in accordance with internal logic 54 provided in a controller/processing unit 56 of the charger 10. An external power control switch (such as switch 18 or the like) may still be provided for such a design as a manual back-up or override—for example, if the user wants to manually turn off the charger 10 to preserve battery instead of waiting for the internal battery unit 50 or an electronic device connected thereto are fully charged.

Still further, the charger 10 can be designed so that the power control switch 18 controls the charge provided from the charger unit 10 to an electronic device connected to the charger unit 10, but where the charge provided to the charger unit 10 from an external power source is automatically provided to the rechargeable internal battery upon connected of the charger unit with the external power source.

Figure 4:
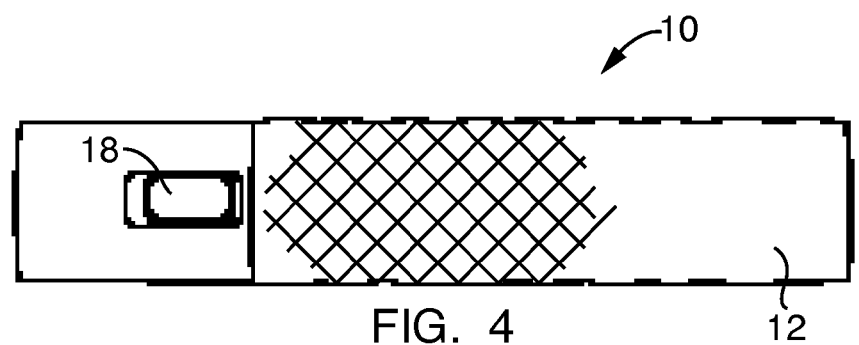
FIG. 4 shows a planar top view of the portable charger of FIG. 1.
Figure 5:
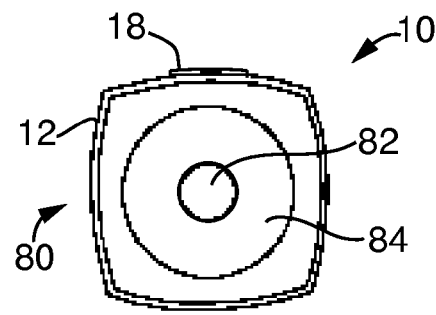
FIG. 5 shows a planar end view of the portable charger of FIG. 1.
Figure 6:
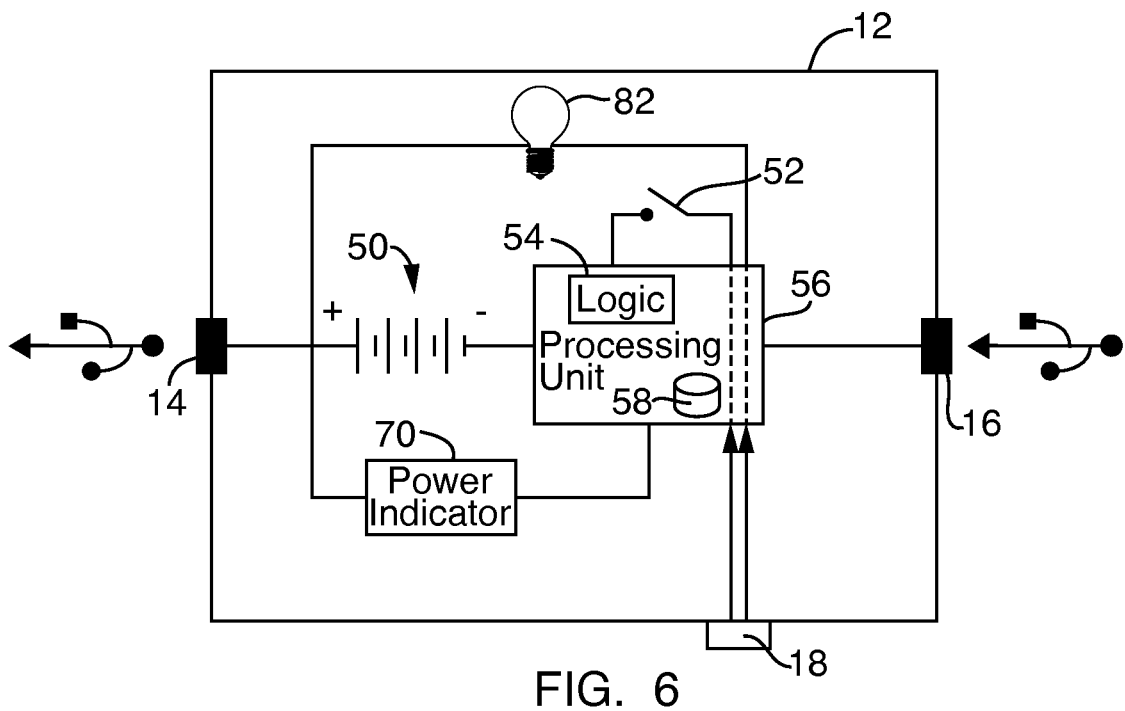
FIG. 6 illustrates a schematic view of internal components of the portable charger of FIG. 1.
Figure 13:
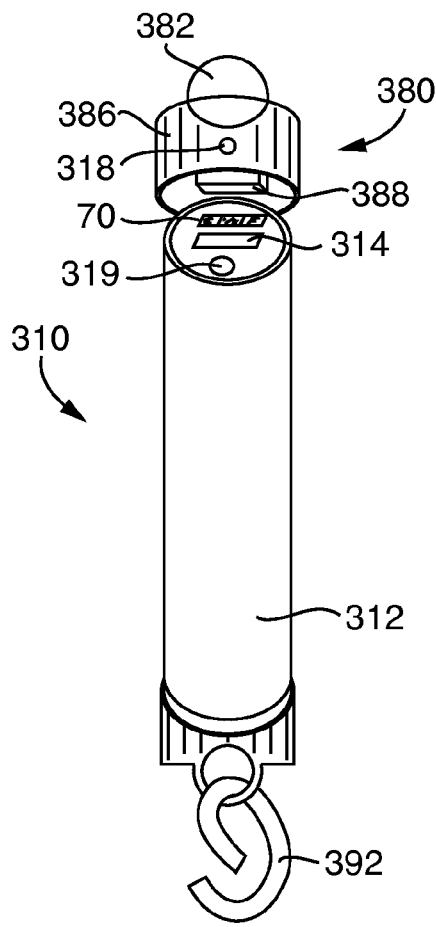
FIG. 13 shows a perspective view of a fourth embodiment of a portable charger in accordance with the present invention.

Referring to FIG. 5, the charger 10 includes a flashlight portion 80 comprising a flashlight bulb or bulbs 82 at one end of the charger housing 12. Preferably, the flashlight comprises at least one LED bulb 82 mounted within the charger housing 12, with a magnifier lens 84 provided on the end of the housing 12 to project light from the charger 10 for use as a flashlight. In the embodiment illustrated in FIG. 1, the flashlight bulb 82 is operatively connected with the rechargeable battery unit 50 of the charger 10 and the power control switch 18. The illustrated power control switch 18 is designed as a two-way switch, and thus controls operation of the flashlight 80 in addition to the power charger 10, as described above. For example, as shown in FIG. 4, the switch 18 can be actuated in one direction to control use of the charger 10 to supply and/or receive a power charge, and in an opposite direction to control use of the flashlight 80 (i.e., turn the flashlight bulb 82 "on" or "off"). As so designed, the switch 18 has an intermediate "off" position, where neither the charger 10 nor the flashlight 80 are "on". In alternate embodiments of the present invention, such as shown in FIGS. 8, 9 and 13, a dedicated power control button or switch (118, 218 and 318) can be provided for operation of the flashlight portion 80 separate from operation of the power charger, allowing use of a flashlight while the charger is being used.

In accordance with intended operation of the portable charger 10 shown in FIG. 1 in accordance with the present invention, a user has the option of recharging one or more electronic devices from a standard power source, such as a computer, a wall socket, a car power outlet, or an airplane power outlet, or using the charger unit 10 when a standard power source is not readily available. For example, the charger 10 of the present invention can be used to charge smart phones, mobile phones, data tablets, music players, cameras, camcorders, gaming units, e-books, Bluetooth® headsets and earpieces, GPS devices, and the like, either individually or collectively in various combinations when the user is away from a standard power source. To do so, an electronic device can be connected to the charger unit 10 using a connector cable 20, such as illustrated in FIG. 15.

As shown in FIG. 15, the connector cable 20 includes a first end 22 with a USB interface 24 for connection with the first power connection port 14 of the charger unit 10. A free second end 26 of the connector cable 20 can be connected with an electronic device. When the connector cable 20 is connected in this manner, the electronic device can be recharged from the rechargeable battery unit 50 of the charger unit 10, which is helpful in situations where a standard power source is not readily available or if power is lost due to weather or an outage. As illustrated, the free second end 26 comprises a coaxial interface 28 designed for receiving interchangeable modular adapter pieces 30a, 30b and 30c, each having a different interface designed for connection with various electronic devices. For example, the first adapter piece 30a shown in FIG. 4 comprises a micro-USB interface, the second adapter piece 30b comprises a mini-USB interface, and the third adapter piece 30c comprises 30-pin interface. A free third end 32 of the connector cable 20 can be likewise connected with an electronic device for recharging that device. Alternatively, one of the second end 26 and the third end 32 could be connected to an external power source while the other free end is connected to an electronic device, as described in more detail below, provided the first power connection port 14 is a two-way charging interface.

Another connector cable can be connected to the second power connection port 16. In the embodiment of FIGS. 1 and 6, a connector cable is connected to the first power connection port 14 for providing a charge from the charger unit 10 to one or more electronic devices, while a connector cable is connected to the second power connection port 16 for recharging the internal battery unit 50 of the charger 10. In alternate embodiments of the portable charger unit, such as illustrated in FIGS. 8, 9 and 13, a single power connection port 114, 214 or 314 is provided, and a connector cable (such as cable 20 shown in FIG. 15) can be used to connect the charger unit 110, 210 or 310 with an external power source and one or more electronic devices via the singular connection port, as desired, including simultaneously.

As further shown in FIG. 15, the free third end 32 of the connector cable 20 comprises a USB interface 34 for connection with an external power source (such as a computer), or alternatively, with another electronic device while the free second end 26 is already connected with an electronic device. As illustrated, various interchangeable modular adapters or power supply connection interfaces 36a, 36b and 36c can be added on the free third end 32 of the connector cable 20. Such adapter pieces 36 may comprise a plug 36a for engagement with a wall socket, a car charger interface 36b for engagement with a car charger socket, and an airplane charger interface 36c for engagement with an airplane charger socket. The illustrated interfaces are shown in certain forms for illustration purposes, and can take the form of any known interface for connecting devices via a connector cable, including but not limited to a USB interface, a mini-USB interface, a micro-USB interface, an AC-to-DC connector interface, or the like. Further, the connector cable 20 can include additional free ends for connection with still further electronic devices as desired. For example, the portable charger unit of the present invention can be used with the squid connector shown and described in co-pending U.S. application Ser. No. 13/571,992, incorporated herein by reference.

Referring again to FIGS. 1 and 6, to recharge the internal battery unit 50 of the charger 10 from an external power source, a connector cable is connected with the external power source and also with the second power connection port 16.

In accordance with the present invention, the charger unit is readily portable as a result of the small size of the housing. Despite the small size of the unit, the power capacity is very high so that the charger can accommodate multiple electronic devices at the same time.

Referring to FIG. 6, the charger unit 10 comprises a rechargeable battery unit 50 disposed within the charger housing 12. In preferred embodiments, the rechargeable battery unit 50 is a Lithium-Ion battery that can be recharged by connecting the charger unit 10 to an external power source, such as a computer, a wall socket, a car or an airplane power supply, using a power connector attached to the second power connection port 16 of the charger unit 10. For example, the power connector can be a connector cable, such as described above, having a mini-USB interface on one end for insertion into the second power connection port 16 of the charger unit 10 and a standard USB interface on the free opposite end for insertion into a USB port of a computer. Alternatively, the USB interface of the cable can be inserted into various adapter pieces or an adapter unit, as mentioned above, for connection to a standard power source, such as a wall-socket via a standard U.S. plug or a variety of foreign plug styles, a car charger socket—e.g., a cigarette lighter socket—via a car charger interface, or an airplane charger socket via an airplane charger interface.

The rechargeable battery unit 50 is operatively connected with the second power connection port 16 for recharging the battery 50 when the charger unit 10 is connected to an external power source via the second power connection port 16. That is, an electrical charge can come into the charger 10 via the port 16 and sent to the internal battery unit 50 for recharging. In this regard, the second power connection port 16 acts as a power input.

The rechargeable battery unit 50 is also operatively connected with the first power connection port 14 for recharging electronic devices connected to the charger unit 10 via the first power connection port 14 from the rechargeable battery unit 50. That is, an electrical charge can be sent from the battery unit 50 to electronic devices connected to the charger 10 via the port 14. In this regard, the first power connection port 14 acts as a power output.

Figure 14:
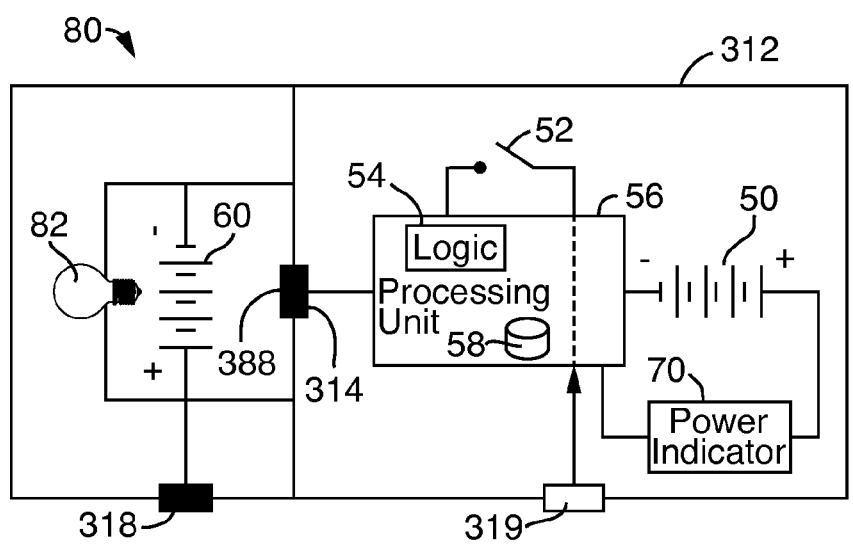
FIG. 14 illustrates a schematic view of internal components of the portable charger of FIG. 13.

The rechargeable battery unit 50 is also operatively connected to the flashlight portion 80 of the charger unit 10. This permits use of the flashlight 80 when it is dark, which can help in use of the charger 10 so that all the components, cables, connection ports, connector interfaces and adapters can be seen to ensure proper engagement and thus proper operation of the charger unit 10. In alternate embodiments, such as illustrated in FIGS. 13-14, a second rechargeable battery unit 60 can be provided for the flashlight portion 380 of the charger unit 310 so that the flashlight portion 380 can continue to be used separate from the charger housing 312. Preferably, such a second battery unit 60 is connectable to the internal battery unit 50 of the charger unit 310 for recharging.

The power charger unit of the present invention can alternately utilize a two-way charging interface, such as described and illustrated in co-pending U.S. application Ser. No. 13/682,985, incorporated herein by reference. As shown, for example, in FIG. 8, a portable power charger 110 includes a charger housing 112 having a single power connection port 114 that operates as a two-way charging interface that operates as both a power input and a power output during operation of the charger unit 110. In accordance with the present invention, the internal battery unit 50 of the charger 110 can be recharged and electronic devices connected with the charger 110 can be recharged, all from the same power connection port 114. Though only shown in FIG. 8 with a single connection port 114, the present invention can be used with additional portable power chargers that have additional input ports, output ports, or two-way connection ports, such as described herein.

Referring to FIG. 8, the charger unit 110 also includes a flashlight portion 180 comprising a flashlight bulb or bulbs 182 at one end of the charger housing 112. Preferably, the flashlight 180 comprises at least one LED bulb 182 mounted within the charger housing 112, with a magnifier lens 184 provided on the end of the housing 112 to project light from the charger 110 for use as a flashlight. In the embodiment illustrated in FIG. 8, the flashlight bulb 182 is operatively connected with the rechargeable battery unit 50 of the charger 110. A power control button 118 is provided to control operation of the flashlight portion 180. The button 118 is also operatively connected to the internal battery unit 50 so that when the button 118 is pressed to turn the flashlight 180 "On," the flashlight 180 is powered by the internal battery unit 50 of the charger 110.

Another embodiment of a portable charger unit 210 with a flashlight portion 280 is illustrated in FIGS. 9-12. As shown, the charger 210 comprised a charger housing 212 having a power connection port 214 that operates as a two-way interface, as described above. The flashlight portion 280 comprises a flashlight bulb or bulbs 282 at one end of the charger housing 212—preferably, at least one LED bulb 282 mounted within the charger housing 212 that is operatively connected to the internal battery unit 50 of the charger 210, with a magnifier lens 284 provided on the end of the housing 212 to project light from the charger 210 for use as a flashlight. As illustrated in FIG. 9, a first power control switch 218 is provided to control operation of the flashlight portion 280 and a second dedicated power control button 219 is provided to control operation of the charger unit 210. The switch 218 and button 219 are both operatively connected to the internal battery unit 50 so that when the switch 218 is moved to turn the flashlight 280 "On," the flashlight 280 is powered by the internal battery unit 50 of the charger 210, and likewise when the button 219 is pressed to turn the charger 210 "On," a charge is supplied from the internal battery unit 50 to the power connection port 214.

Another embodiment of a portable charger unit 310 with a flashlight portion 380 is illustrated in FIG. 13. As shown, the charger 310 includes a charger housing 312 and a flashlight portion 380 in the general form of a cap 386 housing one or more flashlight bulbs 382, that is removably connected to the charger housing 312. The charger housing 312 also comprises a power connection port 314 operatively connected with a rechargeable battery unit 50 disposed within the charger housing 312. The flashlight portion 380 of the charger unit 310 includes a connection interface 388 that is removably connected to the power connection port 314. For example, as illustrated, the power connection port 314 comprises a USB port, and the flashlight portion 380 includes a male USB plug 388 adapted for insertion into the USB port on the charger housing 312. In use, when the flashlight portion 380 is attached to the charger housing 312 via the power connection port 314, the flashlight 380 can be powered by the internal battery 50 of the charger unit 310 and turned on and off via a flashlight power control button 318 included on the flashlight portion 380. When the flashlight portion 380 is removed from the charger housing 312, the power connection port 314 is exposed for connection to an external power source, at least one electronic device, or both. A power control button 319 for the charger 319 may also be provided to control operation of the charger 310 apart from the flashlight portion 380. In embodiments of the present invention, the flashlight portion 380 can remain connected to the charger housing 312 by some means, for example by a tether 390, even when disengaged from the power connection port 314, so that the flashlight portion 380 is not easily lost or misplaced when the charger unit 310 is being recharged or connected to an electronic device.

In an alternate design of the charger unit 310, the flashlight portion 380 can be connected to the charger housing 312 by another means so as to not block or prevent use of the power connection port 314 when the flashlight portion 380 is connected to the charger 310. For example, the power connection port 314 can be provided on the side of the charger housing 312. Additional means of contact can be provided—e.g., respective contacts provided on the charger housing 312 and the flashlight portion 380—that create an electric connection between the charger housing 312 and the flashlight portion 380 when the latter is attached to the former.

In an alternate design of the charger 310 illustrated in FIG. 13, each of the charger housing 312 and the flashlight portion 380 can include its own respective rechargeable battery unit. Such a set-up is schematically illustrated in FIG. 14. Thus, when the flashlight portion 380 is connected to the charger housing 312, for example, via the power connection port 314, the flashlight battery unit 60 is recharged from the charger battery unit 50. When the flashlight portion 380 is removed from the charger housing 312, the flashlight 380 can be used separate from the charger 310—for example, when the charger 310 is connected via the power connection port 314 to an external power source, at least one electronic device, or both. In this regard, the flashlight 380 can be used to ensure that all the components, cables, connection ports, connector interfaces and adapters can be connected and thus ensure proper operation of the charger unit 310. In such embodiments, the second rechargeable battery unit 60 is provided for the flashlight portion 380 of the charger unit 310 so that the flashlight portion 380 can continue to be used separate from the charger housing 312, allowing use of the flashlight 380 while the charger housing 312 is being used to recharge other devices or is being recharged itself.

Though the embodiments shown in FIGS. 8, 9 and 13 illustrate a power connection port as a USB interface, alternate interfaces can be used without departing from the spirit and principles of the present invention. For example, the power connection port can be a mini-USB port, a micro-USB port, an AC/DC interface, or the like, and the flashlight portion can be provided with a complementary male interface adapted for insertion into the power connection port. Alternately, a power connection port can be provided on the charger housing, while the power connection between the charger housing and the flashlight portion can be created by additional means of contact—e.g., respective contacts provided on the charger housing and the flashlight portion that create an electric connection between the charger housing and the flashlight portion when the latter is attached to the former.

Referring again to FIG. 13, the charger housing 312 is also provided with a spring-loaded hook or carabiner clip 392 for attaching the charger 310 to clothing, a bag, or the like. The charger housing 312 can also be provided with a magnet (not shown) for increased functionality, include for placing the charger unit in a car or office for convenient positioning and ease of use.

Referring again to FIG. 6, the charger unit 10 comprises a controller, including a processing unit 56, configured to execute instructions and to carry out operations associated with the charger unit. For example, the processing unit 56 can keep track of the capacity level of the internal battery unit 50, store data or provide a conduit means by which data can be exchanged between electronic devices, such as between a smart phone and a computer. The processing unit 56 also determines how an electrical charge should be directed within a charger, especially when power connection ports with two-way charging interfaces are provided on the charger.

In each of the illustrated embodiments, the charger housing includes a power indicator means 70 that indicates the remaining capacity of the internal battery 50 in the charger unit. For example, in an embodiment of the present invention illustrated in FIG. 1, the power indicator means 70 comprises a single light that turns on when the internal battery unit 50 is activated to provide a charge. In FIGS. 8, 9 and 13, the power indicator means 70 comprises a series of lights, which can include more or fewer lights without departing from the principles and spirit of the present invention, that light up to indicate the power level of the internal battery 50. In operation, the processing unit 56 communicates with the battery unit 50 to determine how much capacity is remaining in the battery 50. Upon determining the capacity level, the processing unit 56 communicates with the power indicator means 70 to provide the user with the appropriate signal for showing how much capacity is remaining in the internal rechargeable battery unit 50. For example, when the battery 50 is at full capacity (F), all the lights in a series of lights will be lit up. As the battery power decreases, the lights will correspondingly decrease by one as the power is used. If there is no capacity left in the internal battery unit 50 (E), none of the lights will be lit up, or an "empty" indicator may be lit up. Alternately, a single light, such as shown in FIG. 1, can change color to indicate the power level. For example, when the charge is high, the light can be green; when the charge is medium, the light can be yellow, and when the charge is low or exhausted, the light can be red. Still further, the power indicator means 70 can comprise a digital interface that provides a battery capacity level for the internal rechargeable battery unit 50, or another known means of providing battery level information.

The power indicator means can also confirm that the internal switch 52 of the charger has been turned "on" by lighting up. As shown in FIG. 6, the internal switch 52 is operatively connected to the rechargeable battery unit 50 and the power indicator means 70 via the processing unit 56. Once the switch 52 is closed to turn on the charger, the power indicator means 70 will provide an indication that the charger is operating.

Upon shut down of the charger unit, the power indicator means 70 will preferably indicate that the charger is being turned off—for example, the lights will provide a sequential blinking signal. This signal is useful when the charger is automatically shutting off after the relevant batteries have been fully charged and a predesignated time delay has elapsed, as discussed below.

The charger housing may include additional indicator means providing additional information for separate functions of the charger unit. For example, separate indicator means can be provided to indicate that an electrical current is being supplied to one or more electronic devices connected to the charger unit. Alternatively, a second power indicator means can be provided to indicate that the charger is on or off, especially useful in embodiments of the present invention utilizing an automatic activation/deactivation logic that don't require a manual power button. For example, the power control button 118 shown in FIG. 8 can include an LED ring 72 around the button 118 that lights up when the charger is in use. Similarly, the button 219 shown in FIG. 9 can light up—e.g., be backlit by an LED light—to indicate when the charger 210 and/or the flashlight 280 are in use. A similar indicator means (e.g., LED-backlit lightning bolt 74 in FIG. 10) can be provided on the other side of the charger 210, again to indicate that the power charger is in use. Likewise, the power control button 319 shown in FIG. 13 can light up to indicate when the charger 310 is in use.

As illustrated in various embodiments herein, a portable power charger in accordance with the present invention generally includes a power control button or switch for turning the flashlight on and off. This control button or switch may also be used to control operation of the power charger itself—that is, to provide a charge to electronic devices connected to the power charger, and/or to recharge the internal battery unit 50 of the charger. A power charger in accordance with the present invention may also have an automatic power control for use of the internal battery 50 for recharging without departing from the spirit and principles of the present invention or without affecting use of the flashlight provided with the charger unit. In this regard, the charger unit of the present invention can also include operational logic 52, as controlled by the processing unit 56, that automatically turns the charger on and off for operation. In preferred embodiments, the charger unit turns on when an electronic device needing charging is connected with the charger via a power connection port. As illustrated in FIG. 7, the charger unit 10 includes an internal switch 52 disposed within the charger housing 12. In a preferred embodiment, the switch 52 actuates to an "On" position when an electronic device is connected to the charger unit 10 via a power connection port 14. Once the internal battery 50 of the charger unit 10 and the battery of any electronic device connected to the charger unit 10 are fully charged, then the charger unit 10 will shut off, preferably automatically, and more preferably after a predesignated time delay. For example, the charger 210 illustrated in FIG. 9 preferably utilizes an automatic on/off functionality, but also includes the power control button 219 so that the user can manually turn the charger 210 on and off as desired.

The processing unit 56 also preferably includes a timer for automatically turning the charger unit 10 off if there is no device attached to the unit 10 for a predetermined period of time, or if the internal battery unit 50 of the charger 10 is fully charged, or if any electronic device attached to the charger unit 10 is fully charged. In this regard, the capacity of the battery 50 can be preserved. Preferably, there is a time delay before the charger shuts down—for example, once an action is complete, such as the internal battery unit 50 is fully charged, the timer will begin a predesignated time delay, after which the charger will turn off and the battery unit 50 will be deactivated. In the case where the charger is being recharged from an external power source and recharging electronic devices at the same time, the charger will wait until all relevant batteries are fully charged before beginning the time delay for shut off. As noted above, a manual on/off switch (such as power control switch 18) can still be provided, and a user can manually shut off the charger at any time as desired. Moreover, even when operation of the internal battery 50 to recharge electronic devices connected to the charger unit is automatically controlled by internal logic 52, such a charger unit will preferably include a switch or button for controlling operation of the flashlight portion of the charger.

The charger housing generally encloses various electrical components (such as integrated circuit chips and other circuitry) to provide computing operations for the device. The integrated circuitry and other components may comprise a power supply (e.g., the internal rechargeable battery), a microprocessor and controller (e.g., a CPU), memory (e.g., ROM, RAM, flash), a circuit board, a hard drive, and/or various input/output (I/O) support circuitry. The electrical components may also include components for sending and receiving data and media (e.g., antenna, receiver, transmitter, transceiver, etc.).

The processing unit 56 further includes a storage unit 58 that provides a place to hold data or instructions for operation of the charger unit and rechargeable battery unit 50, or data exchanged between the charger unit, a computer, and electronic devices connected to the charger unit, or memory needed for further operations of the charger unit.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A portable charger for recharging at least one electronic device having a rechargeable internal battery, said portable charger unit comprising:

a charger housing internally storing a rechargeable battery;

a first power connection port operatively connected to the internal battery capable of acting as at least one of a power input and a power output;

a flashlight portion including at least one bulb operatively connected to the internal battery;

a connector cable capable of connecting the charger with an external power source and at least one electronic device at the same time via the first power connection port;

an internal switch operatively connected to set the first power connection port as a power input or a power output; and internal logic operative to actuate the internal switch according to what is connected to the first power connection port, wherein the internal logic actuates the internal switch to set the first power connection port as a power input when it is connected to an external power source that provides an electrical charge to the charger for recharging the internal battery; and wherein the internal logic actuates the internal switch to set the first power connection port as a power output when the first power connection port is connected to at least one electronic device, and a charge is provided from the internal battery of the charger to the at least one electronic device to recharge the internal battery of said electronic device when said electronic device is connected to the charger via the first power connection port.

2. A portable charger for recharging at least one electronic device having a rechargeable internal battery, said portable charger unit comprising:
- a charger housing internally storing a rechargeable battery;
- at least one power connection port operatively connected to the internal battery capable of acting as at least one of a power input and a power output depending on what is connected to the charger unit via the power connection port;
- a flashlight portion including at least one bulb operatively connected to the internal battery;
- a connector cable capable of connecting the charger with at least one electronic device via the at least one power connection port;
- an internal switch operatively connected between the internal battery and the at least one power connection port to turn the at least one power connection port and and off; and
- internal logic operative to actuate the internal switch according to what is connected to the at least one power connection port,
- wherein the internal logic actuates the internal switch to turn on the at least one power connection port when a first end of the connector cable is connected to the at least one power connection port and the at least one electronic device is connected to a second end of the connector cable.

3. The portable charger according to claim 2, wherein the internal logic actuates the internal switch to automatically turn on the at least one power connection port when the internal battery of the at least one electronic device connected to the charger via the at least one power connection port is fully charged.

4. The portable charger according to claim 3, wherein internal logic actuates the internal switch to automatically turn off the at least one power connection port after a predesignated time delay following the internal battery of the at least one electronic device being fully charged.

5. A portable charger for recharging at least one electronic device having a rechargeable internal battery, said portable charger unit comprising:
- a charger housing internally storing a rechargeable battery;
- at least one power connection port operatively connected to the internal battery capable of acting as at least one of a power input and a power output depending on what is connected to the charger unit via the power connection port;
- a flashlight portion including at least one bulb operatively connected to the internal battery; and
- a control button for the flashlight bulb,
- wherein the control button is also operatively connected to the at least one power connection port for controlling the provision of a charge to the at least one power connection port.

6. The portable charger according to claim 5, wherein the at least one power connection port comprises a first power connection port operatively connected to the internal battery capable of acting as a power input and a power output depending on what is connected to the charger via the first power connection port;
- wherein said charger acts as a power input when the first power connection port is connected to an external power source that provides an electrical charge to the charger for recharging the internal battery when the charger is connected to said power source via the first power connection port; and
- wherein said charger acts as a power output when the first power connection port is connected to at least one electronic device, and a charger is provided from the internal battery of the charger to the at least one electronic device to recharge the internal battery of said electronic device when said electronic device is connected to the charger via the first power connection port.

7. The portable charger according to claim 6, further comprising a connector cable capable of connecting the charger with an external power source and at least one electronic device at the same time via the first power connection port.

8. The portable charger according to claim 5, further comprising a connector cable capable of connecting the charger with at least one electronic device via the at least one power connection port, wherein the charger automatically turns on when a first end of the connector cable is connected to the at least one power connection port and the at least one electronic device is connected to a second end of the connector cable.

9. The portable charger according to claim 8, wherein the charger unit automatically turns off when the internal battery of the at least one electronic device connected to the charger via the at least one power connection port is fully charged.

10. The portable charger according to claim 9, wherein the charger automatically turns off after a predesignated time delay following the internal battery of the at least one electronic device being fully charged.

* * * * *